United States Patent [19]

Margraf

[11] Patent Number: 4,468,240
[45] Date of Patent: Aug. 28, 1984

[54] FILTERING SEPARATORS HAVING FILTER CLEANING APPARATUS

[76] Inventor: Adolf Margraf, Am Schleplingsbach 46, 3060 Stadthagen, Fed. Rep. of Germany

[21] Appl. No.: 356,188

[22] Filed: Mar. 8, 1982

[30] Foreign Application Priority Data

Mar. 24, 1981 [DE] Fed. Rep. of Germany ....... 3111502

[51] Int. Cl.³ ............................................. B01D 46/04
[52] U.S. Cl. ....................................... 55/290; 55/302; 55/303
[58] Field of Search ................................ 55/284–288, 55/291, 294, 302, 303

[56] References Cited

U.S. PATENT DOCUMENTS

| 3,178,868 | 4/1965 | Gibby ............................... | 55/302 |
| 3,951,627 | 4/1976 | Barr, Jr. et al. ................... | 55/284 |

FOREIGN PATENT DOCUMENTS

| 1915155 | 10/1970 | Fed. Rep. of Germany ........ | 55/303 |
| 2344474 | 3/1975 | Fed. Rep. of Germany ........ | 55/294 |
| 2434354 | 1/1976 | Fed. Rep. of Germany ........ | 55/294 |
| 2450751 | 3/1976 | Fed. Rep. of Germany ........ | 55/294 |
| 1600045 | 8/1970 | France ................................ | 55/294 |
| 3965 | 1/1980 | Japan ................................... | 55/287 |

*Primary Examiner*—David L. Lacey
*Attorney, Agent, or Firm*—Balogh, Osann, Kramer, Dvorak Genova & Traub

[57] ABSTRACT

This invention relates to filtering separators of the kind having a housing which is subdivided by a partition, provided with parallel rows of holes or slots, into a dust-laden gas space for receiving filter elements positioned in parallel rows and being impinged upon by dust-laden gas from the outside towards the inside, and a clean gas space. In addition, the housing is provided with a chamber for cleansing the filter element surfaces of a row by counterflow action while covering at the same time the partition holes or slots leading to the adjacent rows of filter elements. The chamber is arranged for the supply of compressed air to at least one injector arranged to feed compressed air and secondary air to the row of filter elements to be cleansed. The chamber is also reciprocatingly displaceable along the partition in periodic and intermittent manner. According to the invention, a surface of the chamber facing towards the partition covers at least two of the rows of holes or slots of the partition, and the chamber is closed upon itself with respect to the clean gas space, and is connected to a compressed air reservoir via a distributor pipe and a control valve. At least one of the rows of holes or slots of the partition and the respective row of filter elements in flow communication therewith are in flow communication with the discharge side of at least one injector acted upon with compressed air. At least one other row of the rows of holes or slots of the partition and the respective row of filter elements is in flow communication with the suction side of the injector.

11 Claims, 6 Drawing Figures

FIG.2
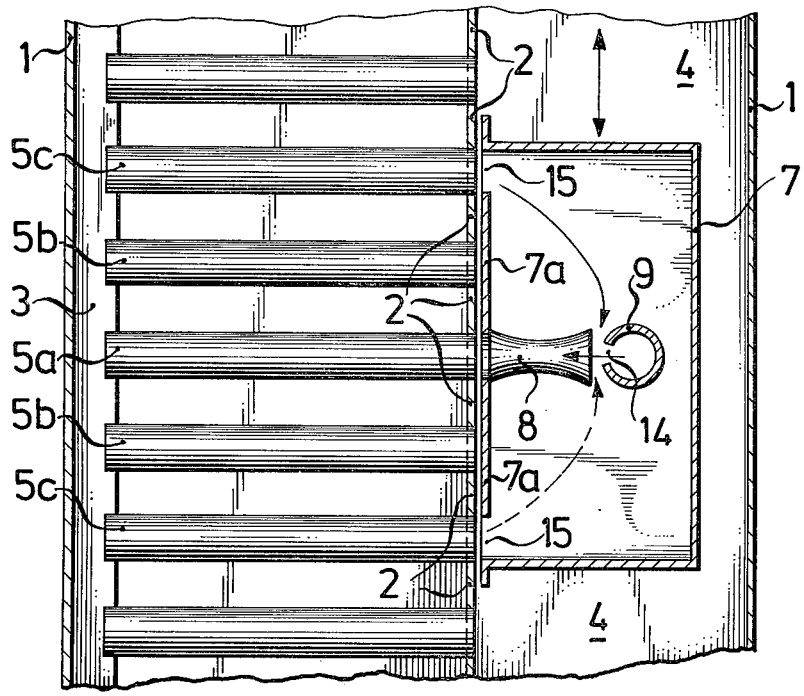
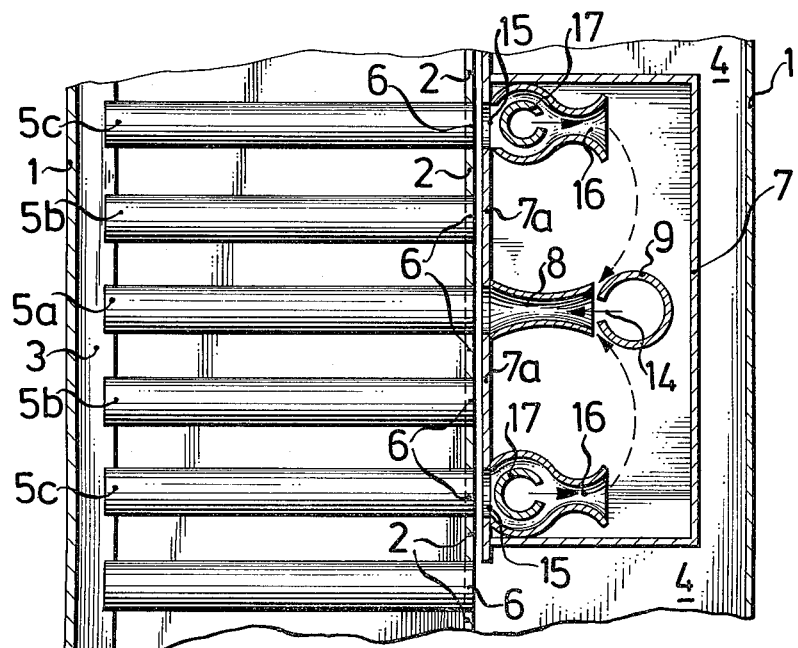
FIG.3

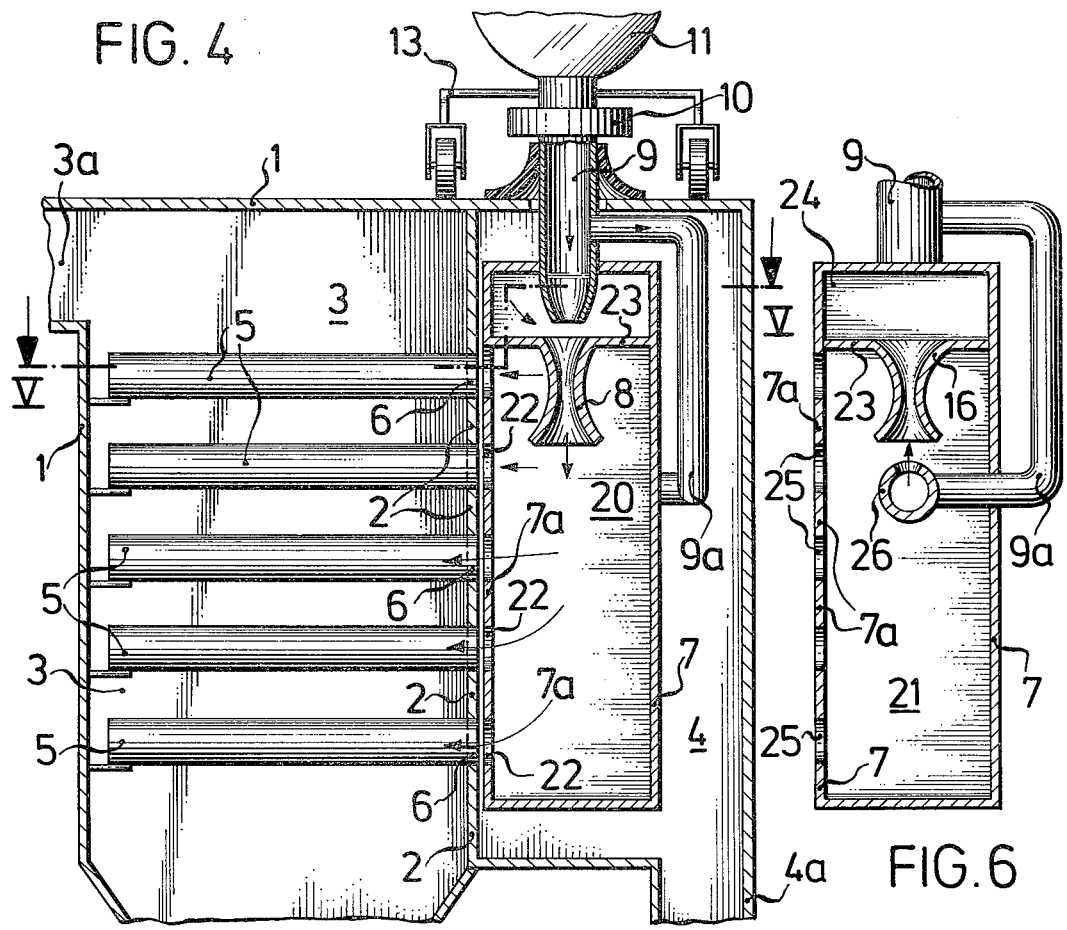
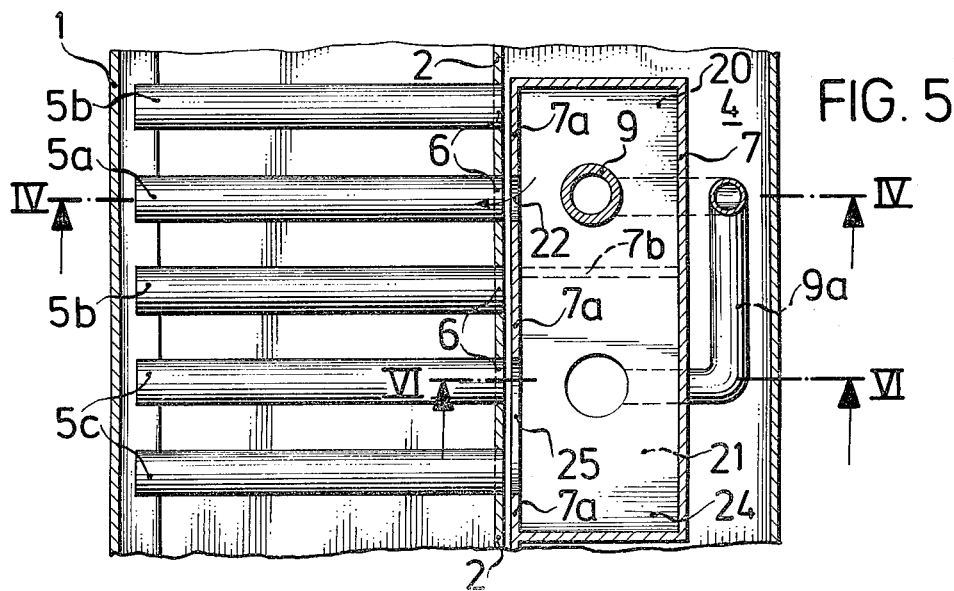

FILTERING SEPARATORS HAVING FILTER CLEANING APPARATUS

BACKGROUND OF THE INVENTION

The present invention relates to filtering separators, of the kind having a housing which is subdivided by a partition, provided with parallel rows of holes or slots, into a dust-laden gas space for receiving filter elements positioned in parallel rows and being impinged upon by dust-laden gas from the outside towards the inside, and a clean gas space. In addition, a chamber is provided in the housing for cleansing the filter element surfaces of a row by counterflow action and simultaneously covering of a part of the rows of holes of the partition. The chamber is arranged for supply of compressed air to at least one injector arranged to feed compressed air and secondary air to the row of filter elements to be cleansed, the chamber being receiprocatingly displaceable along the partition in periodic and intermittent manner. Hereinafter, such separators will be referred to as "of the kind described".

In known counterflow cleaning operations of filter elements of a filtering separator of the kind described, e.g. in accordance with the German Patent Specification No. 1,228,130, each filter element (which may be in the form of a tube or a bag) has allocated to it an injector operating with compressed air, (through which pulses of compressed air are supplied periodically), together with entrained secondary clean air from a clean gas space, in counterflow to the dust-laden gas. It is a disadvantage that the compressed air is initially utilized to impose impingement of the filter elements in counterflow to the dust-laden gas flow, (i.e. a power loss occurs), since a pressure which corresponds to the prevailing filter resistance and distinctly exceeds the same must be built up and be exceeded by means of the injectors. In view of the required compressed air operating briefly and applied in pulsed manner, the dust released from the filter surfaces, (in particular slowly dropping dust), has insufficient time to drop downwards into the dust collection space, so that after switching over to dedusting, the filter elements are immediately impinged upon again by a part of the dust freed. Furthermore, at first the filter surfaces acted upon by the pressurised gas bulge out but after the compressed gas flow they are knocked back violently against the inner spacing elements of the filter elements (carpet beating effect), so that dust particles still present in the filter material are freed and thereby enter the inside of the filter elements, and thus the clean gas.

In the counterflow cleansing of the filter elements hereinabove referred to in accordance with German Patent Specification No. 2,450,751, a chamber including one or more compressed air injectors is reciprocated in the clean gas space along a perforated or slotted partition of the housing, so that the filter elements supplied with compressed air via the partition holes are impinged upon and cleansed in counterflow with the dust-laden gas. To this end, the filter element rows beside the filter element row switched to cleansing by means of the compressed air injectors are covered by lateral flanges of plates of the injector chamber, so that the freed dust has enough time to drop and cannot settle again immediately on adjacent filter elements switched to dedusting. In this case, the supply of compressed air occurs via a control valve, whereas the required secondary air is fed to the suction side of the compressed air injector or injectors from the outside via a duct of larger diameter and a valve situtated therein and which is to be opened. Compared to the rapidly operating compressed air control valves, the inertia of such valves is so great that the maximum required secondary air is not secured, in any case, during compressed air pulses lasting no more than approximately 0.1 second. This arrangement is thus unusable in practice. In view of the utilisation of secondary air from the ambient atmosphere, this air must be brought to a temperature lying above the dew point in the case of dust-laden gases containing water. In cases where filters are used for cleansing inert gases (for example in coal dust plants), the supply of external secondary air is disadvantageous and not permissible under various circumstances.

In light of the above problems, it is an object of the invention to avoid or at least minimize the drawbacks of the aforementioned counterflow cleansing systems for the filter surfaces of filtering separators of the kind described, (often referred to as bag or tube filters), and to provide a simple and uncomplicated structure devoid of any control system for the supply of secondary air to the compressed air injectors.

SUMMARY OF THE INVENTION

To achieve this and other objects in a filtering separator of the kind described, the invention provides for an improved chamber that is closed upon itself with respect to the clean gas space and is connected to a compressed air reservoir only via a distributor pipe and a control valve. One surface of the chamber facing towards the partition covers at least two rows of the partition holes; at least one of the rows of holes of the partition and the filter elements allocated thereto being connected to the discharge side of at least one injector acted upon with compressed air and at least one other row of the partition holes and respective row of the filter elements being in communication with the suction side of the injector.

Due to this arrangement, the reciprocatingly displaceable chamber space is inherently closed off with respect to the clean air gas space and external air, and is connected only via a distributor pipe and a control valve to a compressed air reservoir and via filter elements to the dust-laden gas space. This eliminates any control system. Moreover, any control system is primarily eliminated for the supply of secondary air to the compressed air injectors, because only purified dust-laden gas may enter the displaceable chamber as a secondary gas for feeding into the suction side of the injectors, thereby eliminating any temperature increase beyond the dew point of the dust-laden gas which is to be cleansed (and which possibly contains water). As a result disadvantageous or undesirable oxygen does not penetrate into the chamber or into the dust gas flow in the case of inert dust-laden gases.

Apart from a single known control valve for the supply of compressed air to the injectors, other control means of known construction for the secondary air are thus omitted, and the "carpet beating" effect hereinabove referred to is eliminated by the fact that the rows of partition holes are uncovered progressively only while the chamber travels over this partition.

To give the dust freed from the filter surfaces sufficient time to drop into a lower dust collection space, the chamber wall facing towards the partition covers at least one adjacent row of holes of the partition at one or both sides beside the row of injectors. The communication between the chamber space or of the suction side of the compressed air injector (or injectors) and a row of filter elements is established via a row of holes or slots of the chamber wall.

According to another embodiment of the invention in order that an adequate supply of secondary air (from one or more rows of filter elements not-switched-over to the cleansing action) to the suction side of the compressed air injector (or injectors) is assured in any case, (that is by overcoming the resistance of the filter surfaces of the rows of filter elements), compressed air branch pipes are directed into the suction side (facing towards the row of filter elements) of injector nozzles the orifice of which is directed towards the suction side of the compressed air injectors.

BRIEF DESCRIPTION OF THE DRAWINGS

In order that the invention may be more clearly understood, reference will now be made to the accompanying drawings which show certain embodiments thereof by way of example and in which:

FIG. 2 shows a partial horizontal cross-section along the line II—II of FIG. 1, FIG. 3 shows a partial horizontal cross-section identical to FIG. 2, but with a modified injector chamber, FIG. 4 shows a vertical cross-section corresponding to FIG. 1, with modified guiding of the compressed air and of the secondary air, FIG. 5 shows a partial horizontal cross-section along the broken line V—V of FIG. 4, and FIG. 6 shows a vertical cross-section through the chamber along the line VI—VI of FIG. 5.

DETAILED DESCRIPTION OF PREFERRED EMBODIMENTS

Figure 1:
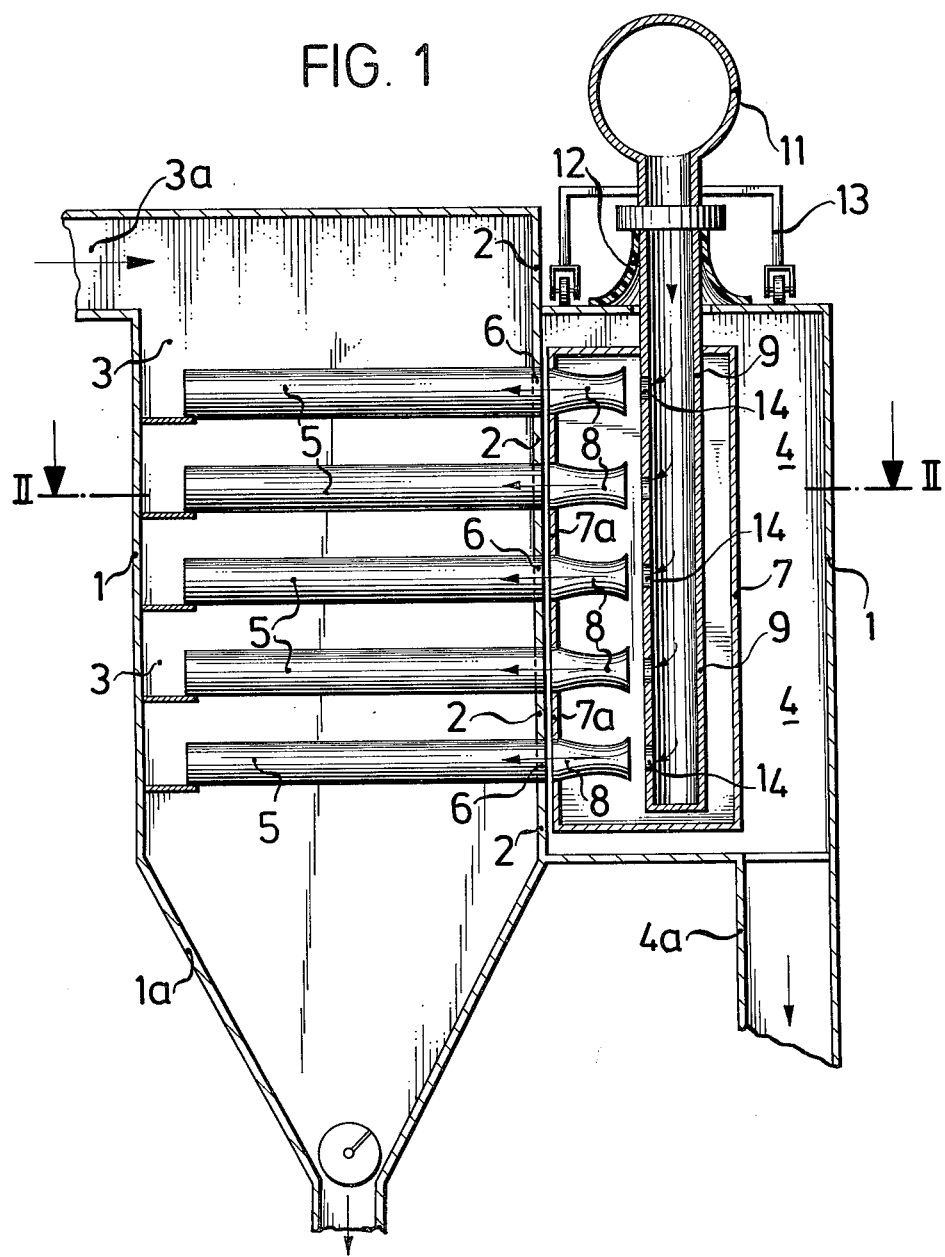
FIG. 1 shows a diagrammatical vertical cross-section through a first embodiment of a filtering separator including compressed air injectors in the chamber displaceable within the clean air gas space.

Referring now to the drawings, identical parts are marked by identical reference symbols in both the embodiments therein depicted.

A conventional filtering separator, e.g. a tubular filter, is illustrated in vertical cross-section in FIG. 1 of the drawings. This filter separator comprises a housing 1 provided with a lower dust collection space 1a, which is subdivided by a partition 2 into a dedusting space 3 having a dust-laden gas feed 3a, and a clean gas space 4 having a clean gas discharge 4a. Filter elements 5 traversed by the dust-laden gas from the outside towards the inside, which are secured in a sealed manner via their aperture rims to the partition 2 and whose open extremities are situated in alignment with holes 6 of rows of holes of the partition 2 corresponding to the rows of elements, are installed in parallel rows in the dedusting space 3.

A closed off chamber 7 is reciprocatingly displaceable along the partition 2 within the clean gas space 4, in the example of FIGS. 1-3. The wall 7a of the chamber 7 facing towards the partition 2 is provided with injector nozzles 8 in flow communication with (leading to) the partition holes 6 and corresponding to the number of filter elements of each row, and a compressed air distributor pipe 9 which is supplied with compressed air from a compressed air feeder, diagrammatically indicated at 11, via a control valve 10, extends through the chamber 7 in accordance with the length of the row of nozzles 8. The distributor pipe 9 for example extends through a known longitudinally extending elastic lip seal 12 sealing off the clean gas space 4. The chamber 7 is periodically displaced reciprocatingly within the clean gas space 4 with the injector nozzles 8 and the distributor pipe 9 by means of a slide or carriage 13 incorporating a suitable drive means, the filter elements 5 of each row of elements of the whole rows of parallel filters being cleansed consecutively.

To accomplish this, the compressed air distributor pipe 9 is provided with small holes or alternatively small nozzles 14, which face towards the injector nozzles 8. After each stepped forward displacement of the chamber 7, the nozzles 8 lie opposite to the holes 6 of a row 5a holes of the partition 2 and are thus aimed into the inside of the corresponding filter elements 5a of the row 5a. The compressed air is thereby forced into the filter elements 5 via the injector nozzles 8, and holes 14, so that the compressed air and entrained clean gas from the chamber 4 cleanses the filter elements in counterflow with the dust gas flow. In order that secondary air may be available for the suction side of the injectors 8 at the same time as the opening of the control valve 10, apart from the compressed air, the chamber wall 7a is provided, as shown in FIG. 2, with at least one row of holes or elongated slots 15 which are advantageously arranged in such manner that, when the filter rows 5b beside the filter row 5a (positioned opposite to the nozzles 8), are covered they establish communication via the holes or slots 15 of the chamber wall 7a with the subsequent row or rows of filter elements 5c, between the filter elements of this row 5c and the chamber space. Clean gas which, (as shown in dotted lines in FIG. 2), is fed as the secondary gas with the compressed air to the suction side of the injectors 8 and to the filter elements 5 of the row 5a (which are to be cleansed and are positioned opposite to the injector nozzles 8), is drawn thereby from the filter elements 5 situated opposite to the holes or slots 15 of the chamber wall 7. It is thus no longer necessary for a pressure rise to have to be engendered initially by means of the injectors and the compressed air, (which distinctly exceeds the filter resistance), to accomplish the counterflow cleansing action. Consequently, compressed air power losses do not occur either, in this case.

Since the row 5b of filter elements situated beside the row 5a of the filter elements 5 which are to be cleansed, is covered by the chamber wall 7, the dust freed from the cleansed filter elements 5 of the row 5a has sufficient time to drop downwards into the dust collection space 1a.

To promote continued flow of clean gas from the dust gas space via the filter elements and the holes or slots 15 into the space of the chamber 7, these holes or slots 15 are followed by nozzles 16 or by a slit nozzle 16 the aperture of which is directed into the chamber space, wherein is situated a compressed air distributor pipe or pipes 17 having outflow holes or slots directed into the chamber space. The distributor pipe or pipes 17 may also be led or directed to the aperture of individual nozzles via a branch pipe in each case. The distributor pipes 17 (or distributor ducts) are most satisfactorily connected to the distributor pipe 9 behind the control valve 10, and may for example be adapted by means of a selected diameter or built-in constrictors to provide (the prevailing requirement) for secondary gas for the injectors.

As shown in FIGS. 2 and 3, the wall 7a of the chamber 7 facing towards the partition 2 covers five parallel rows of filter elements, the filter elements 5 of the middle row 5a of which are cleansed by compressed air and secondary air, the rows of filter elements 5b adjacent thereto at either side being covered and the subsequent rows of elements 5c being connected to the space of the chamber 4 via the holes or slots 15 to feed the secondary gas to the suction side of the injectors 8.

If, furthermore, cleansing of the filter elements 5 of all the rows is undertaken in a step-by-step direction of displacement of the chamber 4 and the chamber 7 travels back to the initial position after turning off the supply of compressed air to the distributor pipe 9. The chamber wall 7a need merely be provided with one row of perforations 15 or an elongated slot which is or are situated behind the row of injectors 8 in the direction of advance of the chamber 4, since the secondary gas may then flow into the chamber space via already cleansed filter elements having a very much smaller resistance.

In the embodiment shown in FIGS. 4, 5, and 6, which is simplified as compared to FIGS. 1 to 3, the chamber 7 reciprocatingly displaceable along the perforated partition 2 within the clean gas space 4 is subdivided into two spaces 20 and 21 by means of a vertical partition 7b extending transversely to the partition 2. The space 20 which can be referred to as the pressure space, is placed in alignment (via a row of holes or slots 22 of the chamber wall 7a) with a row of holes 6 of the partition 2, during the cleansing of each row of filter elements, so that the chamber space 20 is in communication with the row of filter elements 5a which is to be cleansed. The spaces 20 and 21, the latter of which can be referred to as the suction space, are closed off above the rows of partition holes or slots 6 by means of a horizontal partition 23 within the chamber 7, so that a connecting upper space 24 is formed above this wall 23, the purpose of which will shortly be described.

The compressed air distributor pipe 9 of the compressed air reservoir 11 opens into the connecting space 24, the opening being turned towards the suction side of a compressed air injector 8 (the discharge side of which leads into the subjacent chamber space 20 with which the row of filter elements 5a (which is to be cleansed) is in communication via the rows of holes 22,6).

The chamber wall 7a facing towards the partition 2 covers the partition holes of the rows of filter elements 5b beside the row 5a, whereas at least one other row of filter elements 5c is connected via partition holes 6 and holes or slots 25 to the chamber space 21 (suction space). This chamber space 21 is connected via a perforation of the horizontal partition 23 to the connecting space 24. The perforation of the partition 23 is advantageously established by means of an injector nozzle 16 which has compressed air fed to it via a branch pipe 9a of the compressed air distributor pipe 9 via an orifice 26 directed into the suction side of the injector 16. In this embodiment, purified secondary gas is fed in the compressed air injector 8 from the filter elements 5 of the rows of elements 5c via the holes 6,25, to the suction space 21, the injector 16 and the connecting space 24, so that the filter elements 5 of the row of elements 5a are thereupon impinged upon in pulsed manner by compressed air and secondary gas for cleansing the filter surfaces. It will be apparent that every successive row of elements is cleansed in the manner hereinabove described by means of the chamber travelling back and forth in the clean gas space 4. In the case also of FIGS. 4 to 6, cleansing of the rows of filter elements is appropriately performed in one direction of travel only of the chamber, whereas the chamber 7 thereupon returns to the original position again.

What is claimed is:

1. In a filtering separator of the kind having a housing which is subdivided by a partition, provided with a plurality of parallel rows of holes or slots, into a dust-laden gas space and a clean gas space, filter elements disposed in parallel rows in said dust-laden gas space and being in flow communication with the holes or slots of said plurality of parallel rows of holes or slots of said partition, for being impinged upon by dust-laden gas from the outside towards the inside thereof, and a chamber provided in said clean gas space for cleansing the filter element surfaces of a row by counterflow action while part of the rows of said partition holes or slots is covered, said chamber having at least one injector arranged to feed compressed air and secondary air to a row of filter elements to be cleansed, and arranged for supplying compressed air to said at least one injector, said chamber being reciprocatingly displaceable within said clean gas space along said partition in periodic and intermittent manner, the improvement which comprises said chamber being closed upon itself with respect to said clean gas space, and provided with a distributor pipe for supplying compressed air, a control valve is connected to said distributor pipe, and a compressed air reservoir is connected to said control valve for supplying compressed air to said chamber, via said distributor pipe, one surface of said chamber facing towards said partition and covering at least two of the plurality of rows of said partition holes or slots, at least one of the plurality of rows of said partition holes or slots and a respective one of said rows of filter elements being in flow communication therebetween and with the discharge side of said at least one injector acted upon with compressed air, and at least one other row of the plurality of rows of said partition holes or slots and a respective one of said rows of filter elements being in flow communication therebetween and with the suction side of said at least one injector.

2. An improved filtering separator according to claim 1, wherein said at least two rows of partition holes or slots comprise a row of partition holes or slots adjacent to said at least one of the rows of said partition holes or slots in flow communication with the discharge side of said at least one injector.

3. An improved filtering separator according to claim 1, wherein said chamber surface facing towards said partition is provided with rows of holes or slots, and wherein a row of partition holes or slots adjacent to the at least two rows of said partition holes or slots covered by said chamber surface is in flow communication with the suction side of said at least one injector via said rows of holes or slots of said chamber surface facing theretowards.

4. An improved filtering separator according to claim 3, wherein at least one nozzle is disposed in said chamber and is directed into the interior of said chamber, and wherein said rows of holes or slots of said chamber surface face towards said partition and are in flow communication with the suction side of said at least one compressed air injector and with said at least one nozzle.

5. An improved filtering separator according to claim 4, further comprising a compressed air branch pipe connected to said distributor pipe and directed to said at least one nozzle, said at least one nozzle being in flow communication with said distributor pipe via said branch pipe for supplying compressed air to said at least one injector.

6. An improved filtering separator according to claim 4, wherein said at least one nozzle has an aperture directed into said chamber and compressed air distributor pipe disposed therein which is provided with outflow opening directed towards the aperture of said at least one nozzle.

7. An improved filtering separator according to claim 3, wherein said partition comprises at least five rows of holes or slots and said chamber surface facing towards said partition covers at least five of the rows of holes or slots of said partition during the cleansing of the filter elements, and wherein the discharge side of said at least one injector of said chamber directed towards said partition, is situated opposite to a middle row of the at least five rows of holes or slots of said partition and two covered last rows of said partition holes or slots being in alignment with said rows of holes or slots of said chamber surface facing theretowards.

8. An improved filtering separator according to claim 3, wherein the at least two rows of said partition holes or slots covered by said chamber surface comprise two covered last rows of said partition holes or slots which are in flow communication with the suction side of said at least one injector directed into said chamber.

9. An improved filtering separator according to claim 1, wherein said chamber is displaceable in steps during the cleansing operation, and is subdivided by a vertical wall, extending at right angles to said housing partition, into two spaces, one of which is in flow communication with said compressed air reservoir and via said rows of holes or slots of said chamber surface with one of the rows of said partition holes or slots and a respective one of the rows of filter elements, and is arranged to be supplied with pulses of compressed air and secondary gas via said at least one injector, whereas the other one of said two spaces is in flow communication via at least one of said rows of holes or slots of said chamber surface with one of the rows of said partition.

10. An improved filtering separator according to claim 9, wherein said chamber is provided with a horizontal partition closing off said two spaces above the the plurality of rows of said housing partition holes or slots and establishing an upper connecting space therein, and said other one of said two spaces is in flow communication via said upper connecting space with the suction side of said at least one compressed air injector.

11. An improved filtering separator according to claim 9, wherein a compressed air branch pipe connected to said distributor pipe is provided with orifices directed into the suction side of said at least one injector and is in flow communication with the suction side of said at least one injector.

* * * * *